United States Patent [19]

Suzuki et al.

[11] 4,060,694
[45] Nov. 29, 1977

[54] SPEECH RECOGNITION METHOD AND APPARATUS ADAPTED TO A PLURALITY OF DIFFERENT SPEAKERS

[75] Inventors: Matsumi Suzuki; Tetsuro Morino; Shozo Yokota, all of Ebina, Japan

[73] Assignee: Fuji Xerox Co., Ltd., Tokyo, Japan

[21] Appl. No.: 581,083

[22] Filed: May 27, 1975

[30] Foreign Application Priority Data

June 4, 1974 Japan .................................. 49-62526

[51] Int. Cl.² .............................................. G10L 1/02
[52] U.S. Cl. .................... 179/1 SD; 179/1 SB
[58] Field of Search ........................... 179/1 SA, 1 SB

[56] References Cited

U.S. PATENT DOCUMENTS

| | | | |
|---|---|---|---|
| 3,509,280 | 4/1970 | Jones | 179/1 SB |
| 3,592,969 | 7/1971 | Yoshino | 179/1 SD |
| 3,619,509 | 11/1971 | Barger | 179/1 SC |
| 3,673,331 | 6/1972 | Hair | 179/1 SB |
| 3,700,815 | 10/1972 | Diddington | 179/1 SB |
| 3,816,722 | 6/1974 | Sakoe | 179/1 SA |
| 3,864,518 | 2/1975 | Karfaran | 179/1 SA |
| 3,883,850 | 5/1975 | Martin | 179/1 SA |

*Primary Examiner*—Kathleen H. Claffy
*Assistant Examiner*—E. S. Kemeny
*Attorney, Agent, or Firm*—Gerald J. Ferguson, Jr.; Joseph J. Baker

[57] ABSTRACT

Speech recognition in prior art uses one extracted characteristic component ($x_i$) to represent one phoneme ($X_i$) as spoken by one speaker. This invention provides for recognizing the same phoneme as spoken by different speakers, by deriving a group of such components ($x_{ik}$), each a slight variant of the others, to allow finding one component most similar to both the specific phoneme and specific speaker, the method comprising the steps of: normalizing the sound pressure level of an input speech from an unknown speaker; analyzing the normalized voice in a plurality of channels having different frequencies; setting, with respect to the output $F_j$ of each frequency band thus analyzed, a weight $\alpha_j$ of the output $F_j$ so that weight $\alpha_j$ corresponds to a characteristic of a predetermined phoneme $X_i$; extracting the characteristic component $x_i$ of the phoneme $X_i$, setting a weight $\beta_j$ of output $F_j$ so that, when the extracted characteristic component $x_i$ causes a malfunction or error due to another phoneme $X_e$, a characteristic of phoneme $X_e$ is corresponded to; simultaneously extracting the characteristic component $x_e$ of phoneme $X_e$ and, when the difference between the characteristic components thus extracted is greater than a predetermined threshold value $\gamma_i$, applying the difference as a characteristic parameter for the phoneme $x_i$; expanding the characteristic parameter to obtain a characteristic parameter group based on the characteristic parameter, each being slightly different from each other so as to be adapted for individual characteristics of different speakers; subsequently extracting from the characteristic parameter group a characteristic parameter, having maximum similarity to a reference parameter previously memorized, as an adaptive parameter adaptive to the unknown speaker; and, matching a standard pattern derived from the extracted adaptive parameters with an unknown pattern corresponding to the unknown speakers, thereby effecting recognition or analysis of the voice.

2 Claims, 3 Drawing Figures

SPEECH RECOGNITION METHOD AND APPARATUS ADAPTED TO A PLURALITY OF DIFFERENT SPEAKERS

BACKGROUND OF THE INVENTION

1. Field of the Invention

The present invention relates to a method for the automatic recognition of analysis of speech consisting of a plurality of words said by any speaker.

2. Discussion of the Prior Art

Heretofore, a variety of proposals have been offered regarding such methods, among which there has been a method utilizing a sort of threshold logic circuit employs a blind zone unit comprising analog operational elements. This method is executed by subtracting, from a component characterizing a certain phoneme, a component characterizing another phoneme which causes a malfunction. If the value thus obtained is greater than a predetermined threshold value, it is used as a characteristic parameter for characterizing the phoneme. It is possible, in this method, to achieve highly accurate recognition using such characteristic parameters. In this method, a characteristic parameter is extracted according to the following equation.

$$x_i = \sum_{j=1}^{n} \alpha_j F_j - \sum_{j=1}^{n} \beta_j F_j - \gamma_i \quad (1)$$

$$\text{where } x_i = \text{``1'' when } x_i > 0 \\ x_i = \text{``0'' when } x_i \leq 0 \quad (2)$$

In the above equation, $x_i$ is the characteristic parameter corresponding to a phoneme $x_1$; $F_j$ is the output of a band-pass filter; $\gamma_i$ is a threshold value; and $\alpha_j$ and $\beta_j$ are weights.

Regarding the characteristic parameter extracted in accordance with equations (1) and (2), there is a disadvantage in that, although high reliability is achieved with respect to a particular person whose weights $\alpha_j$, $\beta_j$ and threshold value $\gamma_i$ are preset, the same reliability is not ensured for another speaker.

SUMMARY OF THE INVENTION

The present invention lessens the foregoing disadvantage by providing an improved speech analyzing method capable of extracting characteristic parameters having high reliability even when the speakers are different.

Other objects and advantages of this invention will be apparent from a reading of the following specification and claims taken with the drawing.

DETAILED DESCRIPTION OF THE PREFERRED EMBODIMENT

Figure 1:
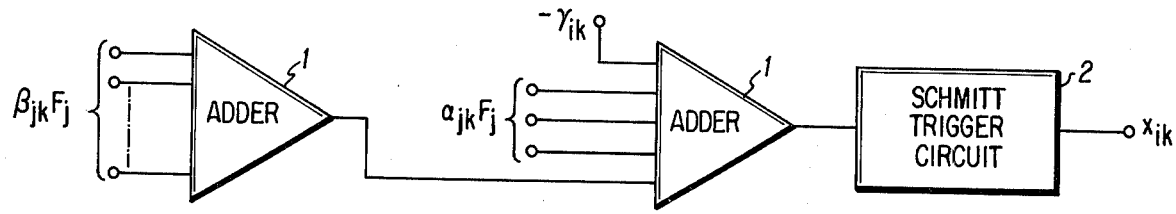
FIG. 1 is a schematic diagram of a characteristic parameter extracting circuit.

The main feature of the recognition method of this invention resides in that the weights $\alpha_j$ and $\beta_j$ in equation (1) are made variable. Thus, they are adapted for any speaker to prevent variations of characteristic parameters due to individual differences of speakers. This is achieved by expanding equation (1) as follows.

$$\begin{bmatrix} x_1 \\ x_2 \\ \vdots \\ x_i \end{bmatrix} = \begin{bmatrix} x_{10}, x_{11}, x_{12} \ldots \ldots x_{1k} \ldots \ldots x_{1p-1} \\ \\ \\ x_{i0}, x_{i1}, \ldots \ldots \ldots x_{ik} \ldots \ldots x_{ip-1} \end{bmatrix} \quad (3)$$

$$\text{where } x_{ik} = \sum_{j=1}^{n} \alpha_{jk} F_j - \sum_{j=1}^{n} \beta_{jk} F_j - \gamma_{ik} \quad (4)$$

$$\text{and } x_{ik} = \text{``1'' when } x_{ik} > 0 \\ x_{ik} = \text{``0'' when } x_{ik} \leq 0 \quad (5)$$

In the equation, $\alpha_{jk}$ and $\beta_{jk}$ are weights of the K-th characteristic parameter $x_{ik}$, and $\gamma_{ik}$ is the threshold value of $x_{ik}$. The K-th characteristic parameter $x_{ik}$ denotes, with respect to the characteristic parameter $x_i$ corresponding to the phoneme $x_i$, the one located in the K-th position from a reference $x_{i0}$ in $[x_{i0}, x_{i1}, x_{i2} \ldots x_{ik} \ldots x_{ip-1}]$, which is an aggregation of P pieces of $x_i$'s obtained by gradually changing the values of weights $\alpha_j$ and $\beta_j$ in equation (1). That is, this parameter corresponds to $x_{ik}$ shown on the right side of equation (3).

In the equation (4) thus expanded, $$\sum_{j=1}^{n} \alpha_{jk} F_j$$

is a K-th component characterizing the phoneme $x_i$, and $$\sum_{j=1}^{n} \beta_{jk} F_j$$

is a K-th component characterizing the other phoneme $X_e$ that causes malfunction in the said $$\sum_{j=1}^{n} \alpha_{jk} F_j.$$

Regarding the input vocabulary of five vowels $|a|$, $|i|$, $|u|$, $|e|$ and $|o|$, the values of respective weights $\alpha_j$ and $\beta_j$ of characteristic parameters $x_1, x_2 \ldots x_5$ were experimentally extended with reference to one speaker A to obtain characteristic parameters having gradually different weights as shown in Table 1. Then, with respect to 50 male adults selected at random, it was confirmed that all the said extended parameters include parameters corresponding to the respective speakers, thus demonstrating the effectiveness of this invention.

Table 1

| Characteristic parameter $x_i$ | Variations of weights $\alpha_j$ and $\beta_j$ of characteristic parameters. | |
|---|---|---|
| | Variation of weight $\alpha_j$ | Variation of weight $\beta_j$ |
| $x_1$ | $\alpha_{1k} - \alpha_1 \pm k\gamma\alpha_1$ | $\beta_{1k} - \beta_1 \mp k\gamma\beta_1$ |
| $x_2$ | $\alpha_{2k} - \alpha_2 \mp k\gamma\alpha_2$ | $\beta_{2k} - \beta_2 \mp k\gamma\beta_2$ |
| $x_3$ | $\alpha_{3k} - \alpha_3 \mp k\gamma\alpha_3$ | $\beta_{3k} - \beta_3 \mp k\gamma\beta_3$ |
| $x_4$ | $\alpha_{4k} - \alpha_4 \mp k\gamma\alpha_4$ | $\beta_{4k} - \beta_4 \mp k\gamma\beta_4$ |
| $x_5$ | $\alpha_{5k} - \alpha_5 \mp k\gamma\alpha_5$ | $\beta_{5k} - \beta_5 \mp k\gamma\beta_5$ |

$k = 0, 1, 2, \ldots p-1; p = 2; \gamma = 0.05$

As will be clear from the equation (4), linear computation is possible to obtain the characteristic parameters extracted in accordance with equations (4) and (5). For example, as illustrated in FIG. 1, a simple circuit comprising two adders 1, each of which typically employ analog computing elements and a Schmitt trigger circuit 2 can be employed. The output of the FIG. 1 circuit consists of, as shown in equation (5), binary "1" and "0" signals which are convenient in digital processing.

Next, a description will be given on how to select a characteristic parameter adapted for a particular speaker out of the characteristic parameters extracted by the circuit of FIG. 1. Suppose a plurality of input words or vocabularies are recognized or analyzed from the said speaker A who serves as a reference speaker. The extracted characteristic parameters $x_1, x_2 \ldots x_i$ (hereinafter referred to as reference parameters) form a time series pattern of binary "1" and "0" signals for each word or vocabulary. This pattern is represented by the following equation.

$$Y_m = \{y_m(t) | x_1(t_{ym}), x_2(t_{ym}), \ldots \ldots x_i(t_{ym})\} \quad (6)$$
where $m = 1, 2, \ldots, g$ In the equation (6), $Y_m$ denotes the input vocabulary to be recognized. It includes, for example: $Y_1$ — one; $Y_2$ — two; $Y_3$ — three; ... $Y_g$ — multiply.

Further, $Y_m$ is a time-series pattern consisting of characteristic parameters $x_1(t_{ym}), x_2(t_{ym}) \ldots x_i(t_{ym})$ for $Y_m$ and also denotes a pattern for time $t$. The time $t_{ym}$ is taken into consideration for characteristic parameters since each parameter is a function of time $t$ in the pattern $Y_m$. That is, the pattern $Y_m(t)$ is characterized by the output state of the respective characteristic parameters $x_1(t_{ym}), x_2(t_{ym}) \ldots x_i(t_{ym})$ with respect to time, namely, by the emerging state of the characteristic parameters in the duration of the input voices (input vocabulary).

Assume an input vocabulary is to be extracted and normalized by the pattern represented by equation (6). That is, the characteristic parameters are extracted from the same vocabulary as above, which is from an unspecified speaker. The characteristics parameters are those shown on the right side of the equation (3). They will be detected to form the following pattern.

$$Y_m = \{y'_m(t) | x_{10}(t_{ym}), x_{11}(t_{ym}), x_{12}(t_{ym}), \ldots \ldots , \quad (7)$$
$$x_{1k}(t_{ym}), \ldots \ldots x_{1p-1}(t_{ym}), x_{20}(t_{ym}), x_{21}(t_{ym}),$$
$$x_{22}(t_{ym}), \ldots \ldots, x_{2k}(t_{ym}), \ldots \ldots, x_{2p-1}(t_{ym}), \ldots \ldots$$
$$\ldots, x_{i0}(t_{ym}), x_{i1}(t_{ym}), x_{i2}(t_{ym}), \ldots \ldots, x_{ik}(t_{ym}),$$
$$\ldots \ldots, x_{ip-1}(t_{ym})\}$$
where $m = 1, 2, \ldots, g$ In equation (7), $Y'_m(t)$ is a time-series pattern corresponding to $Y_m$ and includes parameters that are adaptive to the unspecified speaker and capable of extracting predetermined phonemes (the foregoing parameters being hereinafter referred to as adaptive parameters). In other words, as already stated, adaptive parameters exist in each of the parameter aggregations $\{x_{10}(t'_{ym}), x_{11}(t_{ym}), x_{12}(t_{ym}) \ldots x_{1p-1}(t_{ym})\}$ $\{x_{20}(t_{ym}), x_{21}(t_{ym}), x_{22}(t_{ym}) \ldots x_{20-1}(t_{ym})\} \ldots \{x_{i0}(t_{ym}), x_{i1}(t_{ym}), x_{i2}(t_{ym}) \ldots x_{ip-1}(t_{ym})\}$. For the purpose of selecting such adaptive parameters, the similarity to the reference parameters of speaker A is computed in the following manner. In order to simplify the explanation, a description will be given first on how to select the adaptive parameters out of $\{x_{10}(t_{ym}), x_{11}(t_{ym}), x_{12}(t_{ym}) \ldots x_{1p-1}(t_{ym})\}$ in the respective parameter aggregations. In the following equations:

$$S_{10} = \sum_{m=1}^{g} \psi(x_{10}(t_{ym}), x_1(t_{ym})) \quad (8)$$

$$S_{11} = \sum_{m=1}^{g} \psi(x_{11}(t_{ym}), x_1(t_{ym}))$$

$$S_{12} = \sum_{m=1}^{g} \psi(x_{12}(t_{ym}), x_1(t_{ym}))$$

$$S_{1k} = \sum_{m=1}^{g} \psi(x_{1k}(t_{ym}), x_1(t_{ym}))$$

$$S_{1p-1} = \sum_{m=1}^{g} \psi(x_{1p-1}(t_{ym}), x_1(t_{ym}))$$

$\psi(x_{10}(t_{ym}), x_1(t_{ym}))$ denotes the similarity between parameters $x_{10}(t_{ym})$ and $x_1(t_{ym})$ in the input vocabulary $Y_m$. Accordingly, $S_{10}$ is the sum of the said similarity in each of the vocabularies $Y_1, Y_2, \ldots Y_g$. Also, $\psi(x_{11}(t_{ym}), x_1(t_{ym}))$ denotes the similarity between parameters $x_{11}(t_{ym})$ and $x_1(t_{ym})$, and $S_{11}$ is the sum of the similarity in each of the vocabularies. In the same manner, $S_{1p-1}$ represents the sum of $\psi(x_{1p-1}(t_{ym}), x_1(t_{ym}))$.

Supposing now that, among the sums of similarities $S_{10}, S_{11}, \ldots S_{1p-1}$ in the equation (8) thus obtained, $S_{1k}$ has the greatest value of similarity, then the parameter $x_{1k}$ of $S_{1k}$ is the one peculiar or adaptive to the unknown speaker and capable of extracting the predetermined phoneme. The adaptive parameter thus selected serves to find the similarity in consideration of the entire input vocabularies, so that highly stable characteristic parameters can be selected uniformly for each word or vocabulary. In the same manner, with respect to $\{x_{20}(t_{ym}), x_{21}(t_{ym}), x_{22}(t_{ym}), x_{2p-1}(t_{ym})\} \ldots \{x_{k0}(t_{ym}), x_{k1}(t_{ym}), x_{k2}(t_{ym}) \ldots x_{kp-1}(t_{ym})\}, \ldots \{x_{i0}(t_{ym}), x_{i1}(t_{ym}), x_{i2}(t_{ym}) \ldots x_{ip-1}(t_{ym})\}$, adaptive parameters are selectable out of the respective parameter aggregations by finding similarities to $x_2(t_{ym}) \ldots x_k(t_{ym}) \ldots x_i(t_{ym})$. For practical computation of such similarities, various methods may be considered. In the present invention, since the parameters are binary "1" and "0" signals, the Hamming distance method is adopted, of which minimum distance is applied as the maximum similarity. It is to be understood, however, that employing the Hamming distance method for similarity is merely an exemplary embodiment to which the scope of the invention is not limited. In parameter aggregations, when the sums of similarities for selection of adaptive parameters are equal to each other, the parameter having the next smaller power index of P is selected as the adaptive parameter.

According to the above method, parameters adaptive to any arbitrary speaker are rendered selectable when he voacally repeats the input vocabulary. Now, noting only the adaptive parameters in the equation (7), the pattern may be rearranged as $$Y_m = \{y''_m(t) | x_{1k}(t_{ym}), x_{2k}(t_{ym}) \ldots x_{ik}(t_{ym})\} \quad (9)$$

wherein $m = 1, 2, \ldots g$

Equation (9) represents a rearranged pattern $Y'_m(t)$ derived from the equation (7) and rearranged by noting only the adaptive parameters, in which $x_{1k}(t_{ym}), x_{2k}(t_{ym}) \ldots x_{ik}(t_{ym})$ are the respective adaptive parameters. The pattern of equation (9) thus obtained is usable as a standard pattern to be registered previously by the speaker.

After registration of the standard pattern by the above-described method, the final recognizing operation is performed through matching the standard pattern with an unknown (input) pattern to effect discrimination. The pattern matching is remarkably effective to achieve a simple decision by application of the Hamming distance method, since each pattern consists of binary "1" and "0" signals. To obtain optimum matching, a previous processing of the pattern should be conducted. However, since the pattern is of the time-serious type, time base adjustment and blurring may be conveniently introduced so that optimum matching can be attained by an extremely simple operation.

The standard pattern shown in the equation (9) needs to be replaced for each speaker, and a plural word vocabulary is employed for recognition or analysis, all of the words should be uttered in advance.

Accordingly, the pattern $y_m$ consisting of the reference parameters of equation (6) is usable as a standard pattern instead of the one shown in the equation (9). When equation (9) is applied as the standard pattern, merely the partial utterance of the plural words for recognition or analysis renders possible the selection of adaptive parameters, thereby extremely reducing the number of times of learning.

Figure 2:
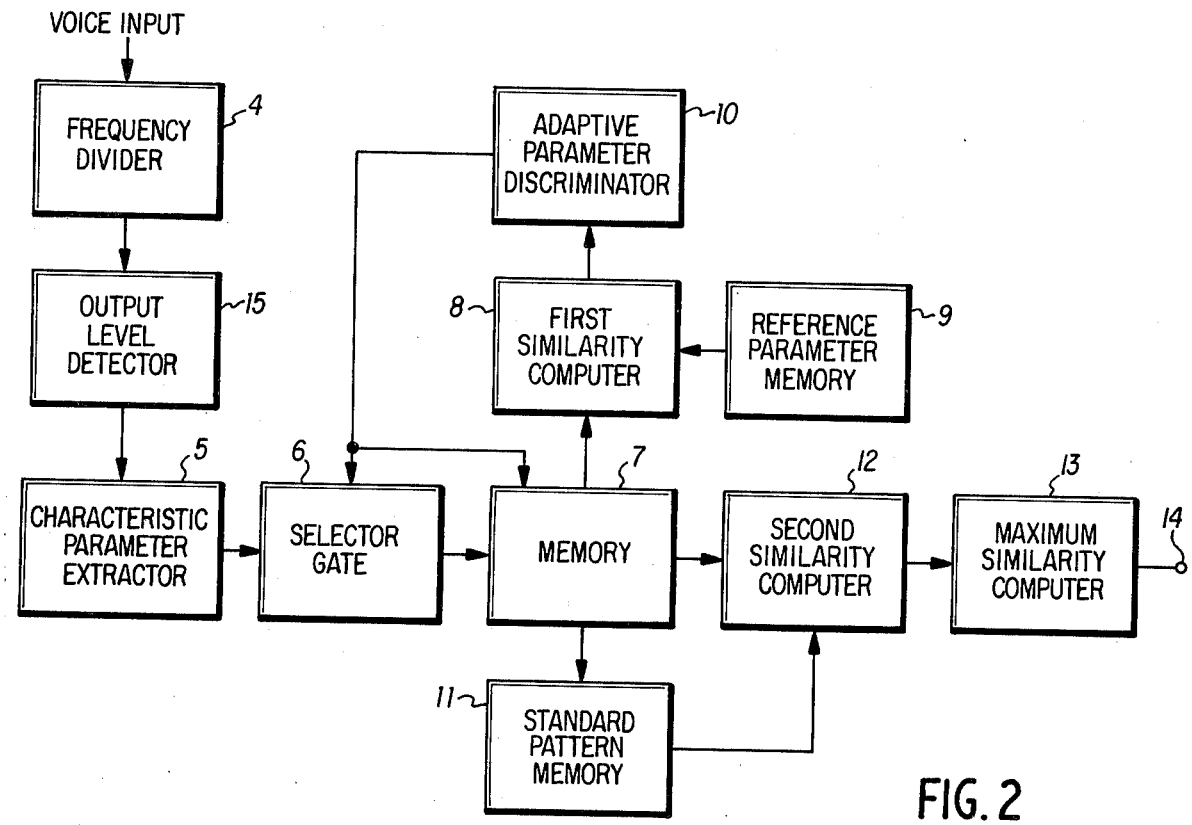
FIG. 2 is a block diagram of a speech recognizing device embodying the method of the invention.

Now an embodiment of the present invention will be described in detail with reference to the accompanying drawings. A word sound uttered by a speaker whose voice is to be recognized is normalized with respect to the sound pressure level thereof. Subsequently, the voice input is applied to a frequency divider 4 shown in FIG. 2, and then is analyzed spectrally by, for example, a 13-channel active filter. The use of an analog filter simplifies the device configuration as compared with a digital filter and it also facilitates spectrum analysis.

The output produced by spectrum analysis is fed to an output level detector 15 in the next stage so as to be sampled at a period of 10 milliseconds, for example, the output being held at the peak value thereof. The output being held is then applied to a characteristic parameter extractor 5, such as shown in FIG. 1, for effecting accurate extraction of the required phoneme information. In characteristic parameter extractor 5, the characteristic parameter for the said phoneme is extracted by a threshold logic circuit. The number of characteristic parameters extracted in accordance with the equation (3) may be 21 in total ($i = 7, p = 2$) in the device of FIG. 2. These parameters form a time-series pattern per input vocabulary or voice. Since each pattern consists of binary "1" and "0" signals, the characteristics of the phonemes are determined by transistions of the pattern with respect to time. Next, the pattern is fed through a selector gate 6 and a memory 7 where the pattern is stored.

A reference parameter memory 9 has previously stored therein a time-series pattern consisting of binary "1" and "0" signals corresponding to equation (6) and based on the characteristic parameters (reference parameters) extracted in response to the utterance of aforesaid reference speaker A. The patterns from both memory 7 and reference parameter memory 9 are simultaneously applied to a first similarity computer 8, where the similarity between them is computed in accordance with equation (8). The output of first similarity computer 8 is applied to an adaptive parameter discriminator 10 where an adaptive parameter corresponding to the maximum similarity is selected, and the selection signal related to the said parameter is fed back to the selector gate 6 and the memory 7. In the selector gate 6, the output gate to the memory 7 is open only for the adaptive parameter in accordance with the input signal, while it is closed for any other parameter.

In memory 7, the time-series pattern of an unspecified speaker including adaptive parameters is rearranged with regard to the adaptive parameters alone in accordance with the above selection signal, and the rearranged pattern is stored as a standard pattern in a standard pattern memory 11. After the above-mentioned operation, the similarity of the unknown pattern (input pattern) uttered and held in the memory 7 is computed in a second similarity computer 12 through pattern matching to the standard pattern stored in the standard pattern memory 11, and the output is fed to a maximum similarity discriminator 13, where the standard pattern corresponding to the maximum similarity is regarded as an input pattern, and the discriminator produces an output as a result of recognition.

Figure 3:
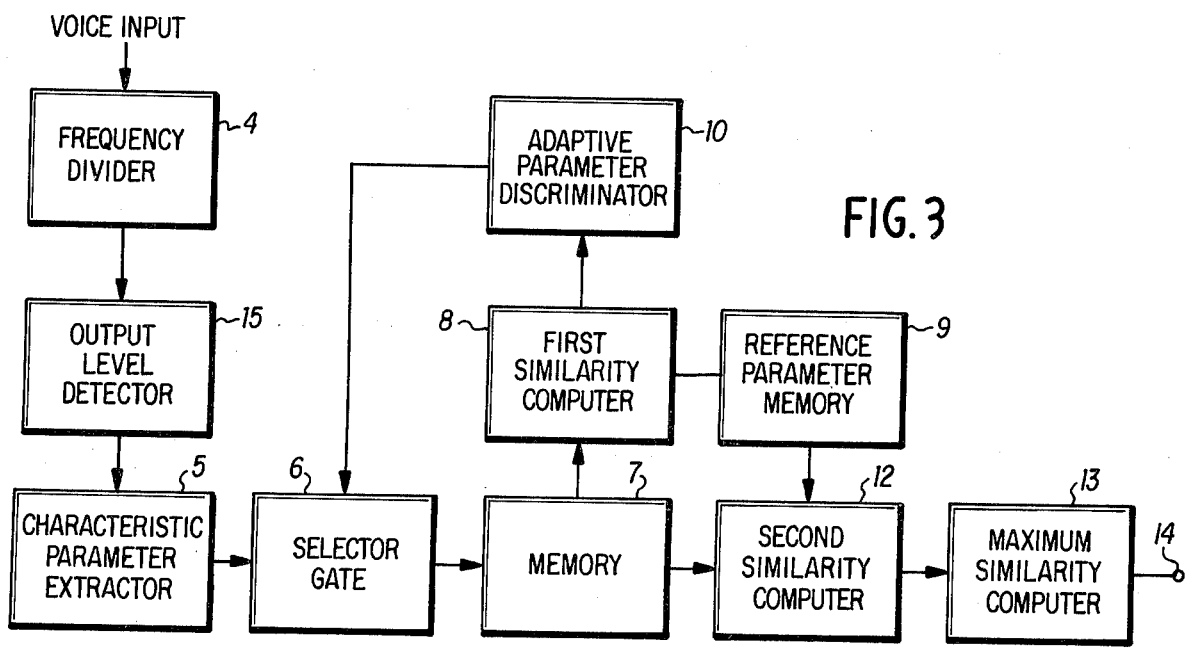
FIG. 3 is a block diagram of another embodiment of the invention.

The pattern stored in the reference parameter memory 9 may be directly applied as a standard pattern. In this case, standard pattern memory 11 becomes unnecessary, so that the device will be such as shown in FIG. 3. That is, recognition is effected as the unknown pattern (input pattern) held in the memory 7 is matched to the pattern in the reference parameter memory 9 by the second similarity computer 12.

According to the present invention, as stated in detail hereinabove, high reliability is always ensured in the extraction of characteristic parameters even for voices of more than two speakers. Since standard patterns are rearranged in the stage of selecting adaptive parameters and then are registered, it is not necessary to repeat utterances of the same vocabulary. Moreover, since pattern $y_m$ consisting of the reference parameters of equation (6) may be used as the standard pattern, selection of adaptive parameters is rendered possible merely by partial utterance of plural vocabularies to be recognized, thereby widely reducing the learning burden on the speaker. Further, because of the pattern composition of the binary "1" and "0" signals, the processing structure to perform the final decision of vocabulary can be remarkably simplified to provide an economical advantage. Furthermore, by expanding the parameters on the right side of the equation (3) up to voices of women and children, it becomes possible to accomplish high-accuracy recognition with respect to many and unspecified speakers.

What is claimed is:
1. Speech recognition method adapted to a plurality of speakers comprising the steps of
storing a plurality of reference parameters for a reference speaker where said reference parameters comprise a sentence of a predetermined vocabulary;
first extracting a characteristic parameter for each phoneme from said sentence when it is uttered by said reference speaker, and
storing a characteristic parameter corresponding to each said phoneme during said storing step where all of said characteristic parameters comprise said reference parameters and where each characteristic parameter $x_i$ is extracted in accordance with the following equation

$$x_i = \sum_{j=1}^{n} \alpha_j F_j - \sum_{j=1}^{n} \beta_j F_j - \gamma_i$$

the foregoing equation being implemented by (a) dividing each phoneme into $n$ frequency bands where $F_j$ is the output of the $j^{th}$ band, (b) respectively weighting each of the outputs the bands where the weight for the $j^{th}$ band for $x_i$ is $\alpha_j$ and the weight for a phoneme which can erroneously be recognized as $x_i$ is $\beta_j$, (c) establishing a predetermined threshold $\gamma_i$ and (d) subtracting the $\beta_j$ weighted $F_j$ outputs and $\gamma_i$ from the $\alpha_j$ weighted $F_j$ outputs to obtain $x_i$;

extracting the characteristic parameters from said sentence when uttered by an unknown speaker in accordance with the following equation $$x_{ik} = \sum_{j=1}^{n} \alpha_{jk} F_j - \sum_{j=1}^{n} \beta_{jk} F_j - \gamma_{ik}$$

where $k = 0, 1, 2, \ldots p-1$, the foregoing equation being implemented by said first extracting step and $p-1$ further extracting steps where each of said further extracting step comprises the same steps (a) through (d) comprising said first extracting step except for respective variations in the values of $\alpha_j$ and $\beta_j$ where $\alpha_{jk}$ is the $k^{th}$ variation of $\alpha_j$ and $\beta_{jk}$ is the $k^{th}$ variation of $\beta_j$ whereby $p$ characteristic parameters are extracted for each phoneme of said sentence;

individually comparing said $p$ characteristic parameters of each phoneme with the reference characteristic parameter extracted for said phoneme from said sentence uttered by said reference speaker;

selecting for each said phoneme the one characteristic parameter from said $p$ characteristic parameters which most closely compares with said reference characteristic parameters, in response to the selected characteristic parameter, selecting from the first extracting steps and said further extracting steps that extracting step which extracted the selected characteristic parameter for each phoneme whereby the selected extracting step is then employed for said unknown speaker; and in response to the selected extracting step, utilizing the characteristic parameters of any sentence using said vocabulary uttered by said unknown speaker to effect recognition of said last-mentioned sentence.

2. Speech recognition apparatus adapted to a plurality of speakers comprising means for storing a plurality of reference parameters for a reference speaker where said reference parameters comprise a sentence of a predetermined vocabulary;

first extracting means for extracting a characteristic parameter for each phoneme from said sentence when it is uttered by said reference speaker, and storing a characteristic parameter corresponding to each said phoneme in said storing means where all of said characteristic parameters comprise said reference parameters and where each characteristic parameter $x_i$ is extracted in accordance with the following equation $$x_i = \sum_{j=1}^{n} \alpha_j F_j - \sum_{j=1}^{n} \beta_j F_j - \gamma_i$$

the foregoing equation being implemented by (a) means for dividing each phoneme into $n$ frequency bands where $F_j$ is the output of the $j^{th}$ band, (b) means for respectively weighting each of the outputs the bands where the weight for the $j^{th}$ band for $x_i$ is $\alpha_j$ and the weight for a phoneme which can erroneously be recognized as $x_i$ is $\beta_j$, (c) means for establishing a predetermined threshold $\gamma_i$ and (d) means for subtracting the $\beta_j$ weighted $F_j$ outputs and $\gamma_i$ from the $\alpha_j$ weighted $F_j$ outputs to obtain $x_i$;

second extracting means for extracting the characteristic parameters from said sentence when uttered by an unknown speaker in accordance with the following equation $$x_{ik} = \sum_{j=1}^{n} \alpha_{jk} F_j - \sum_{j=1}^{n} \beta_{jk} F_j - \gamma_{ik}$$

where $k = 0, 1, 2, \ldots p-1$, the foregoing equation being implemented by said first extracting means and $p-1$ further extracting means where each of said further extracting means comprises the same (a) through (d) comprising said first extracting means except for respective variations in the values of $\alpha_j$ and $\beta_j$ where $\alpha_{jk}$ is the $k^{th}$ variation of $\alpha_j$ and $\beta_{jk}$ is the $k^{th}$ variation of $\beta_j$ whereby $p$ characteristic parameters are extracted for each phoneme of said sentence;

means for individually comparing said $p$ characteristic parameters of each phoneme with the reference characteristic parameter extracted for said phoneme from said sentence uttered by said reference speaker;

means for selecting for each said phoneme the one characteristic parameter from said $p$ characteristic parameters which most closely compares with said reference characteristic parameter, adaptive discriminating means responsive to the selected characteristic parameter for selecting from the first extracting means and said further extracting means that extracting means which extracted the selected characteristic parameter for each phoneme whereby the selected extracting means are then employed for said unknown speaker; and means responsive to the selected extracting means to utilize the characteristic parameters of any sentence using said vocabulary uttered by said unknown speaker to effect recognition of said last-mentioned sentence.

* * * * *